United States Patent
Ghislieri et al.

(10) Patent No.: US 10,363,965 B2
(45) Date of Patent: Jul. 30, 2019

(54) MOTOR VEHICLE PROVIDED WITH A POWERTRAIN UNIT AND A SAFETY DEVICE FOR MOVING THE POWERTRAIN UNIT SIDEWAYS DURING AN IMPACT

(71) Applicant: FCA Italy S.p.A., Turin (IT)

(72) Inventors: Daniele Ghislieri, Turin (IT); Andrea Cristina, Turin (IT); Corrado Borrelli, Turin (IT); Gianfranco Del Nero, Turin (IT); Alessandro Bernardi, Turin (IT); Saverio Gariano, Turin (IT)

(73) Assignee: FCA Italy S.p.A., Turin (IT)

( * ) Notice: Subject to any disclaimer, the term of this patent is extended or adjusted under 35 U.S.C. 154(b) by 137 days.

(21) Appl. No.: 15/695,865

(22) Filed: Sep. 5, 2017

(65) Prior Publication Data

US 2018/0065669 A1 Mar. 8, 2018

(30) Foreign Application Priority Data

Sep. 6, 2016 (EP) .................................. 16425090

(51) Int. Cl.
*B62D 21/15* (2006.01)
*B62D 25/08* (2006.01)
*B60K 28/14* (2006.01)

(52) U.S. Cl.
CPC ......... *B62D 21/152* (2013.01); *B62D 25/082* (2013.01); *B60K 28/14* (2013.01); *B62D 21/155* (2013.01)

(58) Field of Classification Search
CPC .. B62D 21/152; B62D 21/155; B62D 25/082; B60K 28/14
See application file for complete search history.

(56) References Cited

U.S. PATENT DOCUMENTS

| | | | | |
|---|---|---|---|---|
| 6,554,333 B2 * | 4/2003 | Shimotsu | ................ | B60R 19/34 |
| | | | | 293/132 |
| 9,421,865 B2 * | 8/2016 | Bernardi | ............... | B60K 5/1275 |
| 9,550,462 B2 * | 1/2017 | Ramoutar | ............... | B60R 19/24 |
| 9,828,032 B2 * | 11/2017 | Watanabe | ............ | B62D 21/152 |

(Continued)

FOREIGN PATENT DOCUMENTS

EP 2927097 A1 10/2015
JP 2014113894 A 6/2014

OTHER PUBLICATIONS

EP16425090.4: Search Report dated Mar. 1, 2017 (4 pages).

*Primary Examiner* — Karen Beck
(74) *Attorney, Agent, or Firm* — Greer, Burns & Crain, Ltd.

(57) ABSTRACT

A motor vehicle has a front engine compartment housing a powertrain unit and at least one side-member on which a safety device is mounted; the safety device is configured so as to move said powertrain unit sideways during an impact, towards the opposite side to that which is subject to the impact; the safety device is provided with a beam having a first end, spaced from a terminal portion of the side-member towards the outside of the engine compartment, and a second end fixed to the side-member at an intermediate portion next to the powertrain unit; the safety device is further provided with a pin, which is fixed with respect to the second end of the beam and projects from said second end through a hole of the intermediate portion towards the powertrain unit.

12 Claims, 4 Drawing Sheets

(56) References Cited

U.S. PATENT DOCUMENTS

| | | | | |
|---|---|---|---|---|
| 9,981,694 B2* | 5/2018 | Sekiguchi | ............... | B62D 25/08 |
| 2009/0302591 A1* | 12/2009 | Auer | ....................... | B60R 19/54 |
| | | | | 280/784 |
| 2014/0091595 A1 | 4/2014 | Ramoutar et al. | | |
| 2015/0076862 A1* | 3/2015 | Abe | ..................... | B62D 21/152 |
| | | | | 296/187.1 |
| 2015/0329144 A1* | 11/2015 | Hara | .................... | B62D 21/152 |
| | | | | 296/187.09 |
| 2015/0336525 A1* | 11/2015 | Nam | ....................... | B60R 19/04 |
| | | | | 296/187.1 |
| 2016/0039374 A1* | 2/2016 | Sugano | ................... | B60R 19/04 |
| | | | | 293/133 |
| 2016/0059810 A1* | 3/2016 | Watanabe | ............... | B60R 19/24 |
| | | | | 293/133 |
| 2016/0167712 A1* | 6/2016 | Ogawa | .................... | B60R 19/24 |
| | | | | 296/187.1 |

\* cited by examiner

MOTOR VEHICLE PROVIDED WITH A POWERTRAIN UNIT AND A SAFETY DEVICE FOR MOVING THE POWERTRAIN UNIT SIDEWAYS DURING AN IMPACT

RELATED APPLICATIONS

This application claims priority from European Patent Application No. 16425090.4 filed on Sep. 6, 2016, the disclosure of which is incorporated by reference.

FIELD OF THE DISCLOSURE

The present invention relates to a motor vehicle provided with a powertrain unit and with a safety device for moving the powertrain unit sideways during an impact.

BACKGROUND

As known, motor vehicles have a front frame accommodated in the front engine compartment and designed so as to obtain an adequate degree of safety, in particular for the passengers in the passenger compartment, in the event of accidents with front impact.

In particular, the front frame is provided with at least one pair of side-members, connected at their front ends to a bumper and having collapsible zones to absorb energy due to impacts at relatively high speed. In the event of front impact against an obstacle arranged approximately at the centreline of the motor vehicle, the above-mentioned collapsible zones allow an excellent degree of safety to be obtained in the passenger compartment. Nevertheless, when the front impact occurs with an offset, that is with a misalignment with respect to the longitudinal centreline axis, and concerns only a front edge of the motor vehicle, it is expedient to provide additional safety precautions in order to comply with the safety requirements established by the regulations. In particular, said regulations provide safety tests with impacts where there is a so-called "small overlap" (for example equal to 25%) between the motor vehicle and the obstacle during the impact. In these cases, the stresses due to the impact are only unloaded onto one side of the motor vehicle, but the plastic deformation of said side of the frame is not sufficient to absorb all the impact energy, and therefore the passenger compartment is subject to deformations which instead should be avoided to ensure the safety of the passengers.

Some solutions (such as the one shown in the patent application EP2927097, corresponding to the preamble of claim 1) include a safety device with a beam which is arranged beside at least one of the two side-members and which, during the impact, acts as a strut to cause a lateral thrust on the powertrain unit, that is in a transverse direction, towards the side opposite the one subject to the impact, so as to exploit the inertia of the powertrain unit and therefore cause the motor vehicle to move away from the obstacle during the impact. This deviation of the entire motor vehicle in a sideways direction is extremely advantageous for maintaining substantially intact the part of body defining the passenger compartment.

In the known solutions of the just described type, however, the behaviour is not always uniform and does not always correspond to the design specifications.

In fact, it should be borne in mind that, for the same type of motor vehicle and engine compartment, powertrain units are often installed with shapes and dimensions slightly different from each other, that is powertrain units with engines having different displacements and/or with different transmissions (automatic or manual, for example). This difference generally results in a variation in spaces and overall dimensions in the areas where the above-mentioned safety device operates during the impact. Consequently, said variation in spaces and overall dimensions causes a variation in the response times of the thrust on the powertrain unit and therefore of the dynamic behaviour of the motor vehicle during the impact.

Furthermore, even considering one single type of powertrain unit installed in the engine compartment, if the same safety device is mounted on the two sides of the motor vehicle, generally a different dynamic behaviour is noted when the impact occurs with "small overlap" on the right or left, since the position of the powertrain unit is not perfectly centred in the engine compartment and/or the overall dimensions at its opposite lateral ends are different from each other.

The need is therefore felt to provide expedients such as to obtain a more uniform behaviour in dynamic impact conditions with variation in the shape and dimensions of the powertrain unit in the engine compartment and with variation in the side (right or left) on which the frontal impact occurs.

Furthermore, the need is felt to obtain a more effective solution as regards reduction of the response times in the sideways movement caused by the safety beam on the powertrain unit during the impact with "small overlap".

SUMMARY OF THE INVENTION

The object of the present invention is to provide a motor vehicle with a powertrain unit and a safety device to move the powertrain unit sideways during an impact, which meets the needs described above simply and inexpensively, preferably with a limited number of modifications in order to install such a safety device in the motor vehicles that are currently manufactured and do not feature said device.

According to the present invention, a motor vehicle is provided with a powertrain unit and safety device for moving the powertrain unit sideways during an impact, as defined in claim 1.

BRIEF DESCRIPTION OF THE DRAWINGS

For a better understanding of the present invention, a preferred embodiment is now described, purely by way of non-limiting example, with reference to the accompanying drawings, in which.

DETAILED DESCRIPTION

Figure 1:
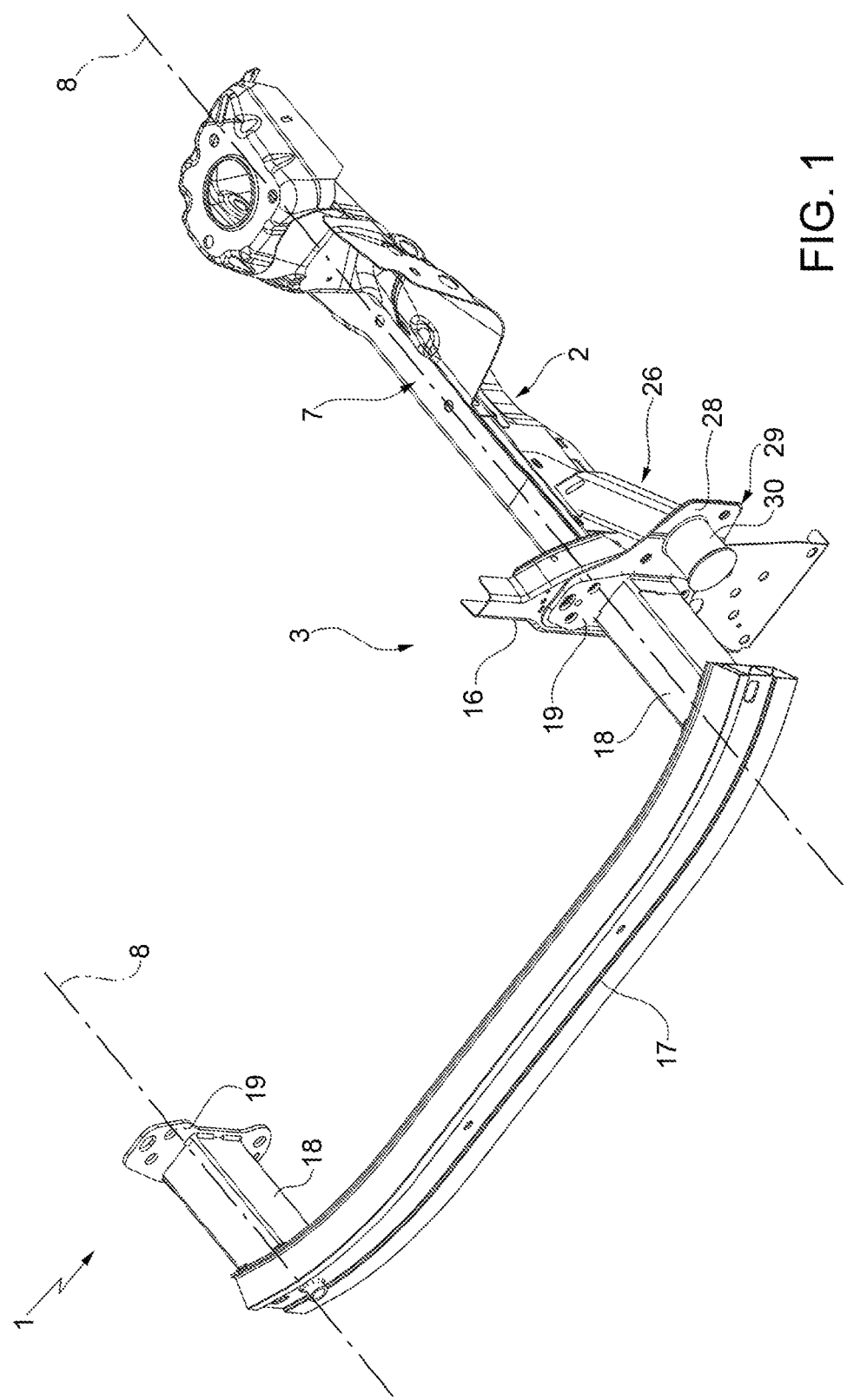
FIG. 1 is a perspective, partial overhead view of a front frame forming part of a preferred embodiment of the motor vehicle according to the present invention.

In FIG. 1, the reference number 1 indicates, as a whole, a motor vehicle, of which only part of a front frame 2 is shown. The front frame 2 defines an engine compartment 3 and is arranged in front of a lower area of a passenger compartment (not shown) of the motor vehicle 1.

The front frame 2 comprises two front side-members 7, only one of which is shown in FIG. 1. The side-members 7 are arranged at the sides of the engine compartment 3, are substantially symmetrical to each other with respect to a vertical longitudinal centreline plane and are elongated along respective axes 8, which are substantially parallel to the advancing longitudinal direction of the motor vehicle 1.

In particular, the side-members 7 project forwards from a wall, commonly called "fire-protection wall", which frontally delimits a lower area of the passenger compartment.

Figure 5:
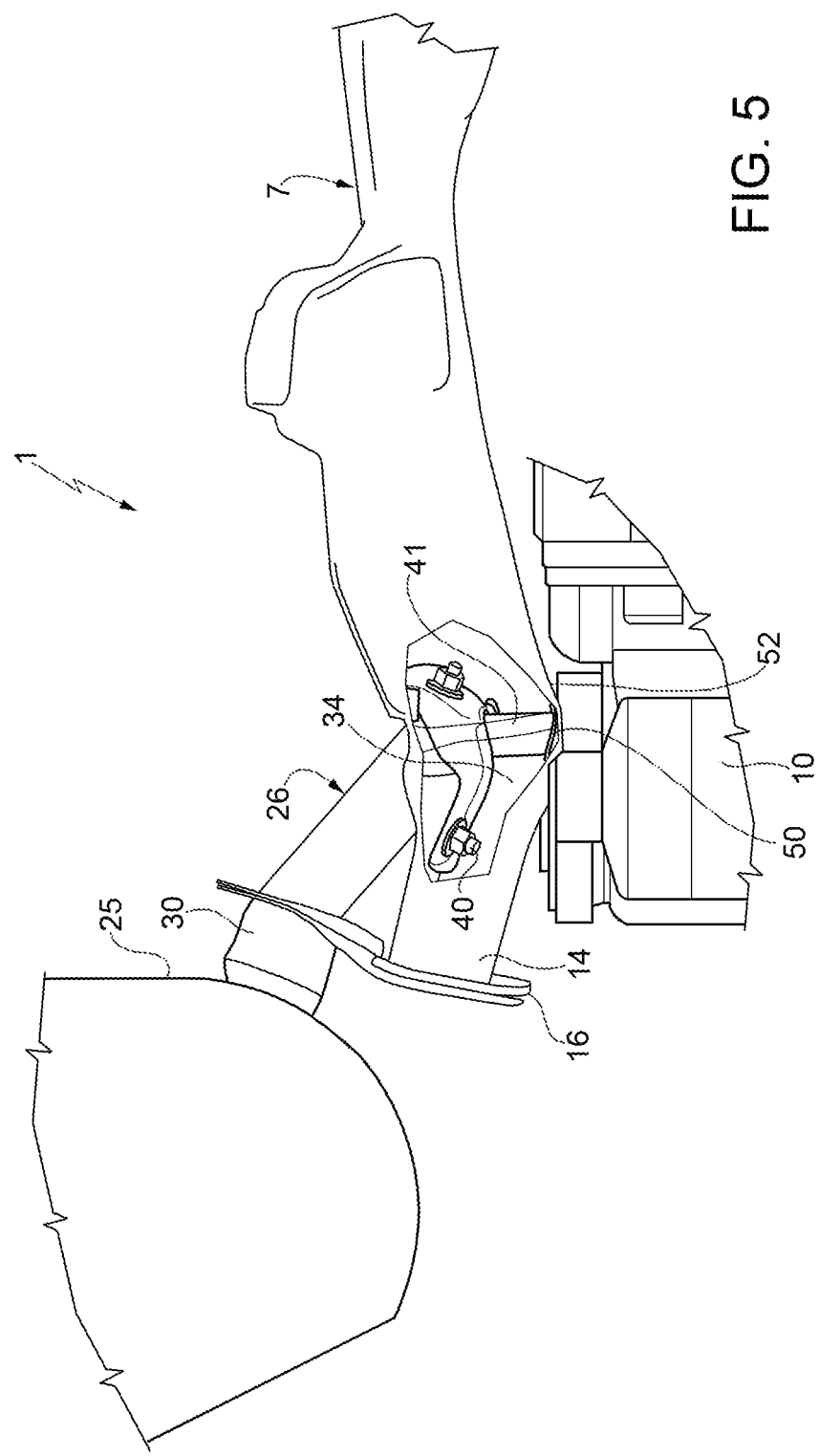
FIG. 5 is an overhead view which shows in a simplified schematic manner the motor vehicle of the present invention during a front impact with an obstacle.

As shown in FIG. 5, the engine compartment 3 houses a powertrain unit 10 (partially shown), which is defined by the ensemble of an engine and a gearbox and is mounted on the front frame 2 in a substantially fixed position according to methods which are known and not described in detail.

The front ends of the side-members 7 are indicated by the reference numbers 14 and are fixed directly or indirectly to respective shaped plates 16, which are substantially vertical. Preferably, the plates 16 are provided with holes defining fixing points for screws or bolts. In particular, the plates 16 are normally called "vertical links" and define the lateral uprights of a substantially vertical annular structure which surrounds and supports a heat exchanger assembly (not shown).

With reference to FIG. 1, the plates 16 carry a bumper, of which only a rigid supporting cross member 17 is shown. In particular, the lateral ends of the cross member 17 are fixed to the plates 16 by means of respective box elements 18, which are aligned respectively with the side-members 7 along the axes 8 and are provided with respective flanges or plates 19 at the rear ends. In particular, the flanges 19 are fixed to the plates 16 by means of screws or bolts.

On at least one of the two sides of the motor vehicle 1, the front frame 2 comprises a safety device 26 which intervenes when a front impact occurs with small overlap (for example 25%) between the motor vehicle 1 and a substantially rigid obstacle 25 (outlined in FIG. 5). The safety device 26 is defined by a structure which, during the impact, due to the deformations moves and performs the function of a strut, pushing the powertrain unit 10 in a transverse direction, towards the side opposite to the one subject to the impact (FIG. 5), so as to exploit the inertia of the powertrain unit 10 to cause the motor vehicle 1 to move sideways away from the obstacle 25.

Figure 2:
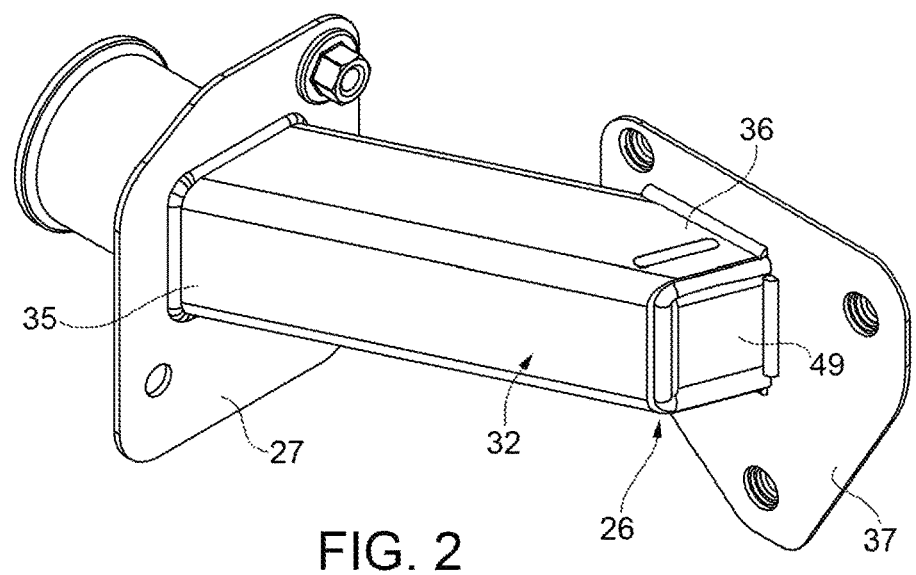
FIG. 2 is a rear lateral perspective, on an enlarged scale, of a detail of FIG. 1, relative to a safety device for moving a powertrain unit of the motor vehicle sideways during an impact.

The safety device 26, which is shown on an enlarged scale in FIG. 2, can be added, with slight modifications, to the ordinary front frames of the known cars currently on the market and preferably comprises a front connecting plate 27, substantially parallel to the plate 16 and fixed with respect to the latter.

In particular, as can be seen in FIG. 1, the plate 27 rests on and is fixed to a projecting lateral portion 28 of an additional plate 29 (FIG. 1), which is arranged in a fixed position, preferably clamped between the flange 19 and a front face of the plate 16. The plate 29 preferably supports an element 30, which has the function of anticipating the interaction between the safety device 26 and the obstacle 25. The element 30 projects from a front face of the portion 28 in a direction opposite to the safety device 26, is arranged alongside and horizontally spaced apart from the element 18 and sustains the impact against the obstacle 25, as outlined in FIG. 5, by means of the interposition of one lateral end of the bumper (not shown).

Figure 3:
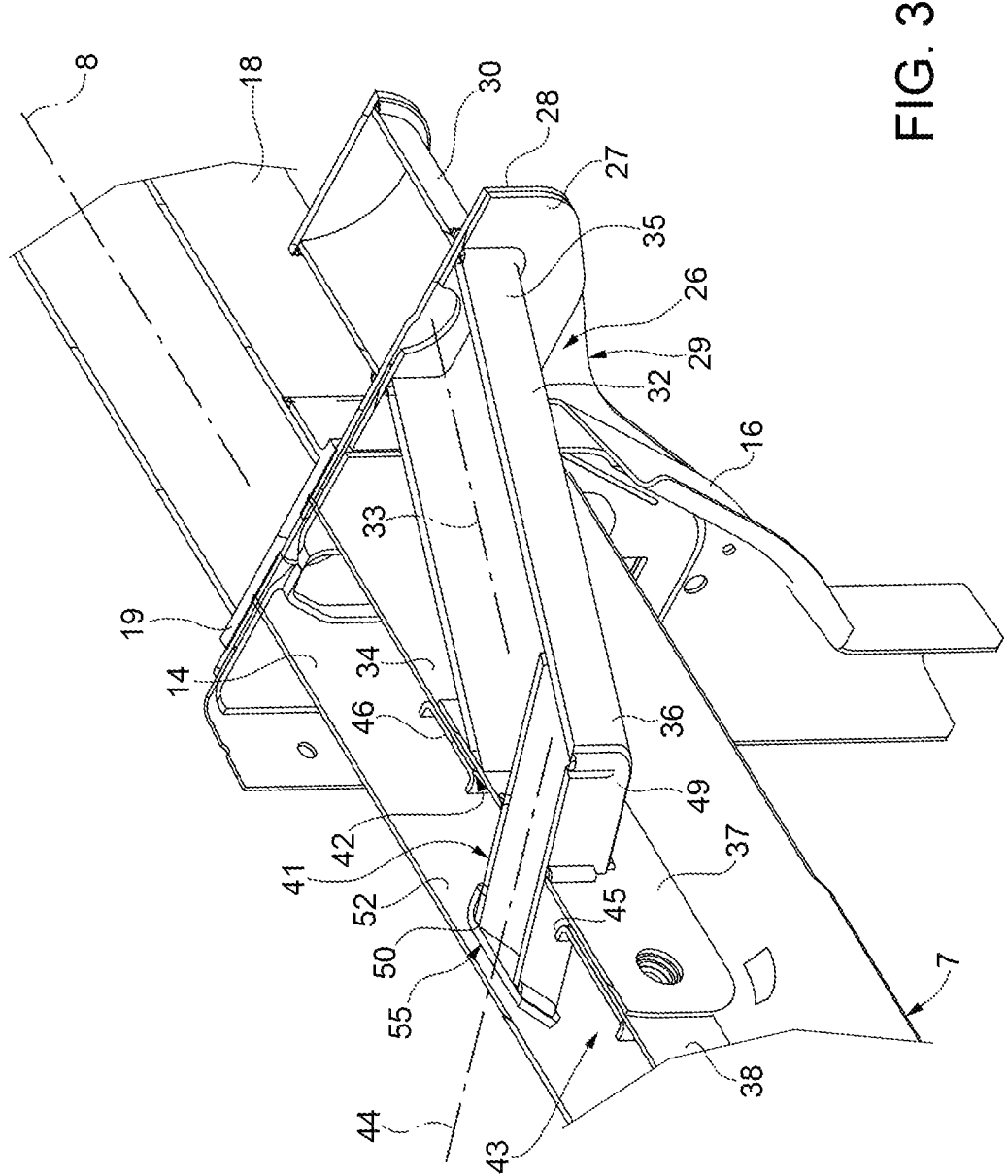

With reference to FIG. 3, the safety device 26 comprises a beam 32, which is arranged beside the end 14 and is elongated along an axis 33 which is horizontal, but inclined with respect to the axis 8, therefore the beam 32 couples with the side-member 7 at an intermediate portion 34 of said side-member 7.

The intermediate portion 34 is horizontally arranged alongside and is relatively near the powertrain unit 10, in the non-deformed condition.

The beam 32 is preferably rectilinear and, advantageously, is defined by a tube. Alternatively, the beam 32 could be defined by a profiled element with a transverse section of open type.

The beam 32 comprises a front end 35, which is preferably welded to the rear face of the plate 27. The end 35 is therefore fixed with respect to the plate 16 and is laterally spaced from the end 14 towards the outside.

The beam 32 further comprises a rear end 36, which is fixed with respect to the intermediate portion 34. The end 36 is fixed, for example by means of welding, to a plate 37, which is arranged on an outer lateral wall 38 of the intermediate portion 34 and is fixed to the wall 38, for example by means of screws or bolts. In other words, the plates 37 and 27 define respective coupling flanges for the ends 35, 36. In particular, the plates 27 and 37 extend on planes substantially vertical and substantially orthogonal to each other.

The screws that connect the plate 37 to the wall 38 are indicated by the reference number 40 in FIG. 5, and are subject mainly to a shear load, parallel to the axis 8, in the event of impact. Said shear load can lead to breaking of the screws 40, but the beam 32 does not decouple from the intermediate portion 34 during the impact. In fact, as shown in FIG. 3, the safety device 26 comprises a pin 41 which is distinct from the screws 40, is fixed to the end 36 and/or to the plate 37, preferably directly, for example by means of welding, and projects with respect to the plate 37 and the end 36 through a hole 42 made in the wall 38 and inside a cavity 43 defined by the intermediate portion 34. The pin 41 extends along an axis 44 which is transverse to the axes 8 and 33 and, in particular, is rectilinear and horizontal.

Figure 4:
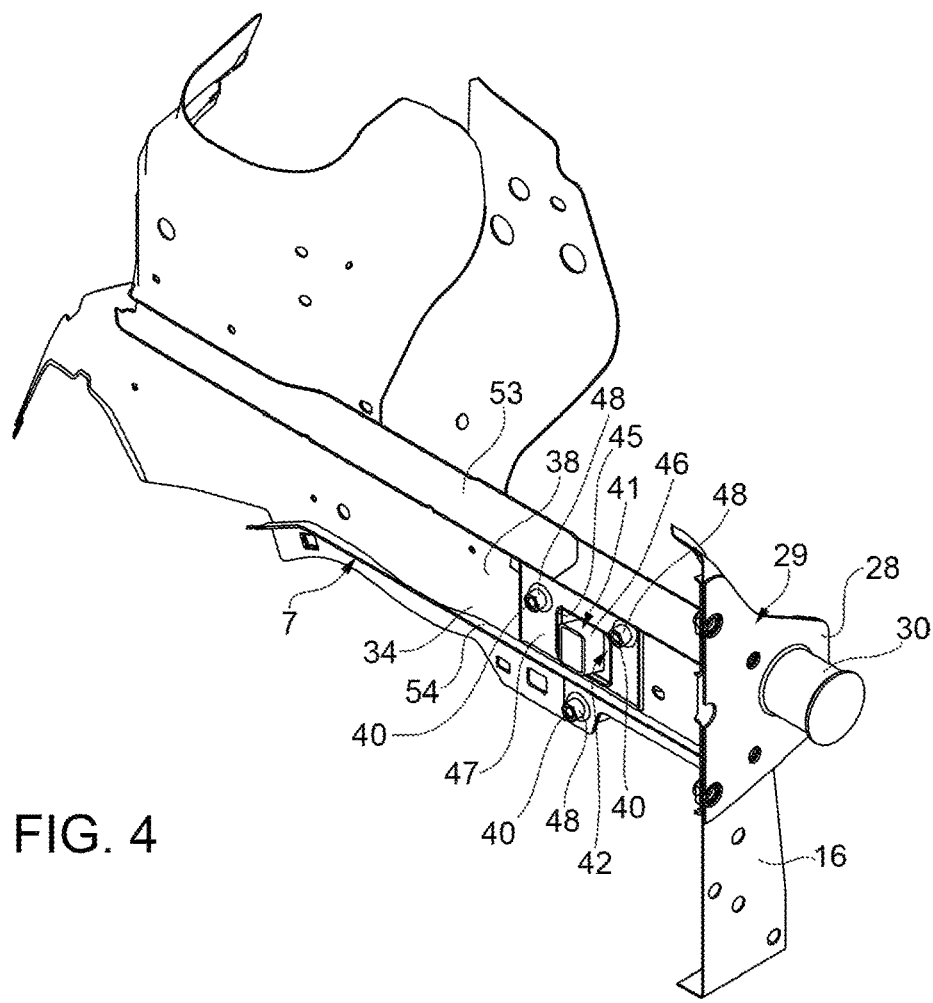
FIGS. 3 and 4 show a detail of FIG. 1, in perspective and in section by means of a horizontal section plane and a longitudinal vertical section plane respectively.

As can be seen in the section of FIG. 4, the wall 38 carries, in a fixed position, a stop abutment 45 which faces and arranged behind an intermediate portion 46 of the pin 41, in a direction parallel to the axis 8, so as to stop the longitudinal sliding of the pin 41, and therefore of the end 36 and the plate 37, along the wall 38, in the event of shearing of the screws 40 during the impact.

Preferably, the stop abutment 45 is defined by a body distinct from the wall 38. In particular, said body is defined by a plate 47 which rests against the wall 38 (more specifically, on the face that defines the cavity 43). Advantageously, the plate 47 has an annular shape, that is, it has a hole aligned with the hole 42, so as to stiffen the wall 38 all around said hole 42.

Preferably, the plate 47 is fixed to the wall 38 by means of welding. Advantageously, the screws 40 are tightened in respective nut screws 48, at least one of which is fixed to the plate 47, for example by means of welding.

As can be seen in FIGS. 2 and 3, the pin 41 comprises a terminal portion 49, which engages a seat of the end 36, preferably without play in a vertical direction. In particular, as mentioned above, the portion 49 is welded to the end 36 and/or to the plate 37.

In particular, as shown in the FIGS. 3 and 4, the cavity 43 is defined by the wall 38, on one side, by a wall 52 on the opposite side, by an upper wall 53 and by a lower wall 54. On the opposite axial part of the portion 49, the pin 41 has an axial end 50, which is vertically spaced from the walls 53 and 54 and is aligned with and facing the wall 52 along the axis 44. As shown in FIG. 5, during the impact with "small overlap", the end 50 comes into contact with the wall 52 and performs a thrust function on said wall 52 and, immediately after, on the powertrain unit 10. Therefore, during the impact, the pin 41 performs not only a longitudinal restraining function, together with the stop abutment 45, but also acts as a strut, together with the beam 32, to push the powertrain unit 10 sideways.

In a non-deformed condition, the clearance between the end 50 and the wall 52 along the axis 44 is the smallest possible, compatibly with the assembly technologies and the foreseen tolerances. Said axial clearance is annulled almost instantly when the element 30 is subject to the impact of the obstacle 25. Alternatively, in a non-deformed condition, the end 50 can be already in contact with the wall 52.

According to variations that are not shown, the wall 52 is absent or is perforated, so that the end 50 of the pin 41 comes into direct contact with the powertrain unit 10 during the impact.

Preferably, in a non-deformed condition, the axis 44 forms an angle ranging from 45° to 90° with the axis 8, hence it is not orthogonal to the axis 8. The actual angle of inclination is established in the design phase so that the axis 44 becomes substantially orthogonal to the advancing longitudinal direction of the motor vehicle 1, due to the deformations, at the moment when the end 50 begins to exert the lateral thrust action on the powertrain unit 10 (FIG. 5). The above-mentioned inclination, furthermore, favours sliding of the intermediate portion 46 on the stop abutment 45 towards the powertrain unit 10 during the deformation of the side-member 7, in the event of breaking of the screws 40, as already mentioned.

According to the preferred shown example, the pin 41 is defined by a tube. Advantageously, the end 50 is defined by a plate or a flange transverse to the axis 44, so as to have a contact surface 55 (FIG. 3) which is relatively high, for resting against the wall 52 and the powertrain unit 10. Preferably, the contact surface 55 is parallel to the wall 52, in a non-deformed condition.

With reference to FIG. 5, in response to the impact against the obstacle 25, the beam 32 is subject to a load which is transmitted towards the intermediate portion 34 along the axis 33. Said load includes a longitudinal load component, parallel to the axis 8, which is supported by the screws 40 and by the stop abutment 45, and a transverse load component, which is transmitted to the intermediate portion 34 and to the pin 41.

Firstly, the transverse load transferred to the intermediate portion 34 causes bending of the side-member 7 at the same intermediate portion 34, which moves towards the inside of the engine compartment 3 until it rests on the powertrain unit 10.

At this point, the transverse load transferred to the pin 41 pushes the powertrain unit 10 in a transverse direction opposite to the side where the impact occurs.

This transverse thrust causes a lateral movement of the powertrain unit 10 which, with its inertia, causes the motor vehicle 1 to move away from the obstacle 25 in a substantially automatic manner, therefore deviating the trajectory with respect to the direction of travel of the motor vehicle 1 prior to the impact.

The pin 41 defines an extension of the beam 32 within the cavity 43 and is relatively rigid to compression along the axis 44 (with respect to the structural characteristics of the surrounding intermediate portion 34). In other words, the pin 41 substantially reduces the distance, in the transverse horizontal direction, between the safety device 26 and the powertrain unit 10, compared to the known solutions in which the pin 41 is not provided.

Such distance reduction causes a reduction in the response times, between the moment at which the impact begins and the moment at which the lateral thrust begins on the powertrain unit 10. In fact, in the known solutions without the pin 41, an additional time is generally necessary relative to collapse in transverse direction of the walls 53 and 54 to cause the structure 26 to push the powertrain unit 10 sideways.

Thanks to this reduction in distance and consequent reduction in response times, the behaviour in dynamic conditions of the safety device 26 is more uniform with variation of the overall dimensions of the powertrain unit 10 installed in the engine compartment 3 and/or with variation of the side of the motor vehicle 1 on which the impact occurs.

It is therefore evident from the above that the safety device 26 is extremely effective compared to the known solutions without the pin 41, thus guaranteeing a high degree of safety for the driver and the front passenger in all conditions and for all conditions in the engine compartment 3.

Moreover, the safety device 26 is extremely simple to mount, also on known motor vehicles already on the market, since it essentially requires only fixing of the plates 29 and 47 and provision of the hole 42, prior to fitting on the front frame 2.

Lastly, from the above it appears evident that modifications and variations can be made to the described and illustrated motor vehicle 1, without departing from the protective scope of the present invention, as defined in the attached claims.

In particular, the conformation and/or the transverse section and/or the connection methods provided for the beam 32 and/or for the pin 41 could be different from those shown and described by way of example.

The invention claimed is:

1. A motor vehicle comprising:
   a front engine compartment;
   a powertrain unit housed in said engine compartment;
   at least one pair of side-members arranged along respective sides of the engine compartment and substantially parallel to an advancing longitudinal axis of the motor vehicle;
   at least one of said side-members comprising:
   an intermediate portion comprising a lateral wall having a hole, and
   a front terminal portion;
   the motor vehicle further comprising at least one safety device configured so as to move said powertrain unit sideways during an impact, towards the opposite side to that which is subject to said impact, and comprising a beam having:
   a first axial end fixed with respect to said terminal portion and horizontally spaced from said terminal portion laterally towards the outside of said engine compartment, and
   a second axial end fixed to said intermediate portion by fixing elements; wherein said safety device further comprises a pin, which is fixed with respect to said second axial end, is a component distinct from said fixing elements, and projects with respect to said second axial end through said hole and towards said powertrain unit.

2. A motor vehicle according to claim 1, wherein said lateral wall carries, in a fixed position, a stop abutment which faces and is arranged behind an intermediate zone of said pin.

3. A motor vehicle according to claim 2, wherein said stop abutment is defined by a body distinct from said lateral wall.

4. A motor vehicle according to claim 3, wherein said stop abutment is defined by a plate fixed to said lateral wall.

5. A motor vehicle according to claim 4, wherein said plate has an annular shape and is arranged around said hole.

6. A motor vehicle according to claim 4, wherein said fixing elements comprise screws tightened in respective nut screws ,at least one of which is fixed to said plate.

7. A motor vehicle according to claim 3, wherein said body is arranged on a face of said lateral wall which faces towards said powertrain unit.

8. A motor vehicle according to claim 1, wherein said pin comprises a terminal portion housed in said second axial end.

9. A motor vehicle according to claim 1, wherein said intermediate portion defines a cavity, and in that said pin has a thrust end which is housed in said cavity.

10. A motor vehicle according to claim 9, wherein said thrust end is housed with clearance in said cavity.

11. A motor vehicle according to claim 9, wherein said thrust end is defined by a flange or a plate, transverse to the axis of said pin.

12. A motor vehicle according to claim 1, wherein said pin extends along an axis which forms an angle ranging from 45° to 90° with the longitudinal axis of said side-member.

* * * * *